(No Model.) 3 Sheets—Sheet 1.

E. F. GORDON.
Rotary Planing Machine.

No. 239,654. Patented April 5, 1881.

Witnesses
Chas C Lund
Frank A Merrill

Inventor
Edward F Gordon (No Model.)  3 Sheets—Sheet 2.
E. F. GORDON.
Rotary Planing Machine.
No. 239,654.  Patented April 5, 1881.
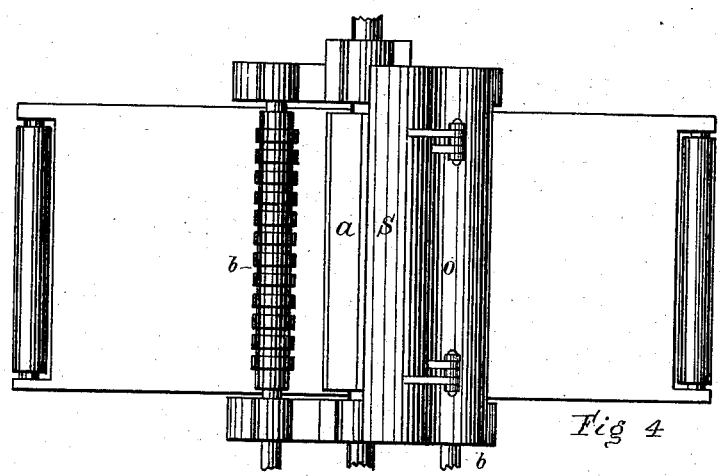
Fig 4
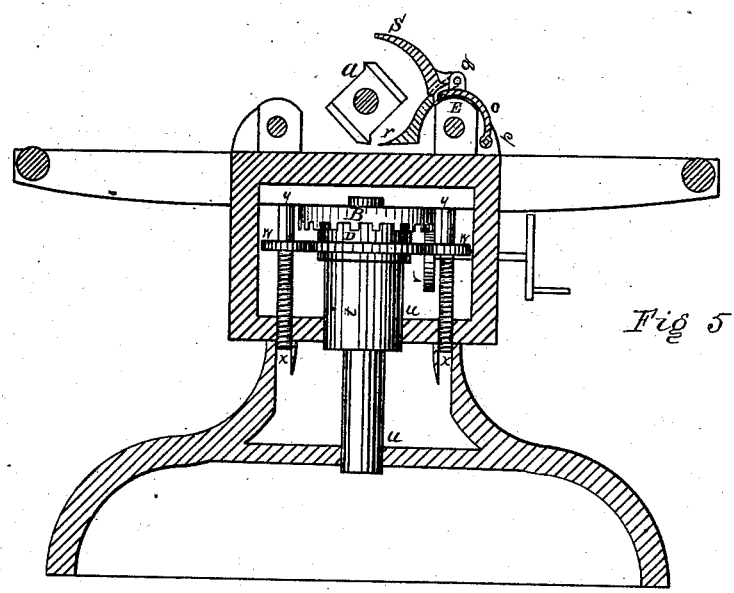
Fig 5
Fig 6  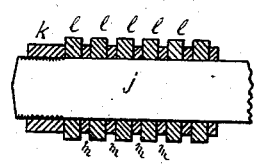 Fig 7
Witnesses
Chas. C. Lund
Frank A. Merrill
Inventor
Edmond F. Gordon (No Model.) 3 Sheets—Sheet 3.

E. F. GORDON.
Rotary Planing Machine.

No. 239,654. Patented April 5, 1881.

Witnesses
Horatio Hobbs
Frank A. Merrill

Inventor
Edward F. Gordon

UNITED STATES PATENT OFFICE.

EDWARD F. GORDON, OF CONCORD, NEW HAMPSHIRE.

ROTARY PLANING-MACHINE.

SPECIFICATION forming part of Letters Patent No. 239,654, dated April 5, 1881.

Application filed September 27, 1880. (No model.)

*To all whom it may concern:*

Be it known that I, EDWARD F. GORDON, of Concord, in the county of Merrimack and State of New Hampshire, have invented certain Improvements in Planing-Machines, of which the following is a specification, reference being had to the accompanying drawings, which are made a part hereof.

Figure 1:
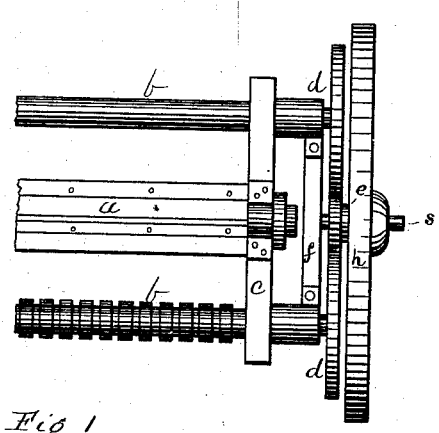
Figure 2:
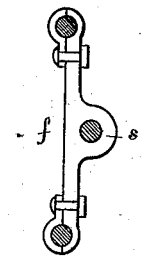
Figure 3:
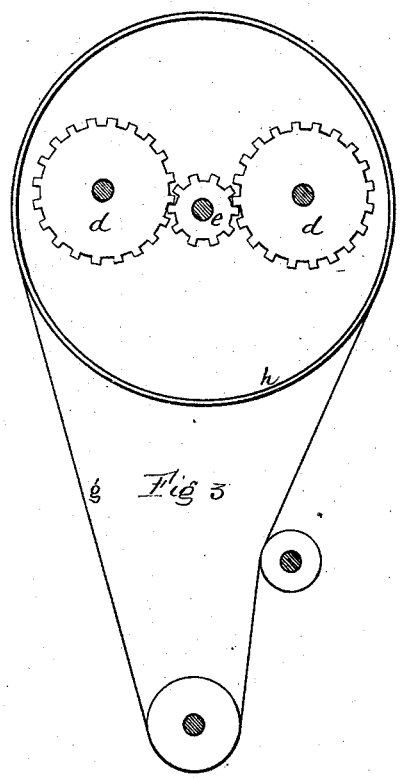
Figure 8:
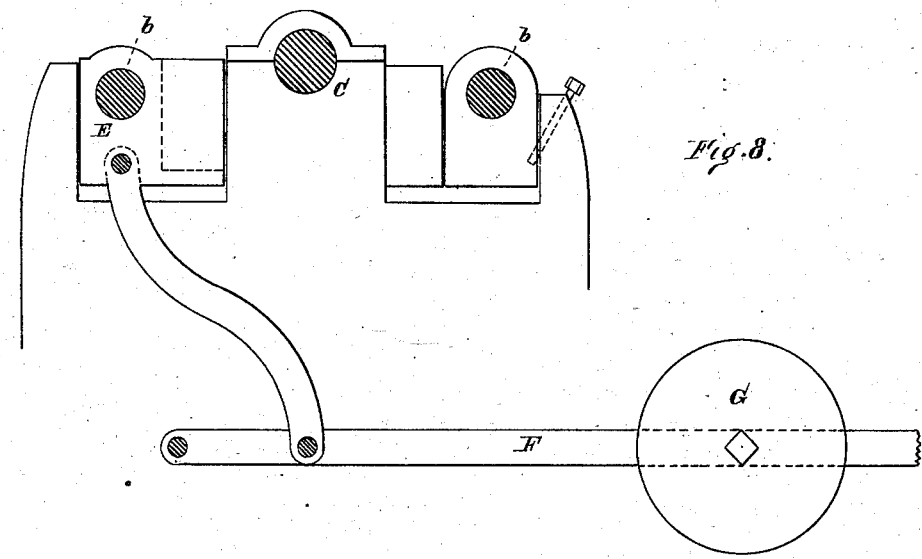
Figures 9, 10:
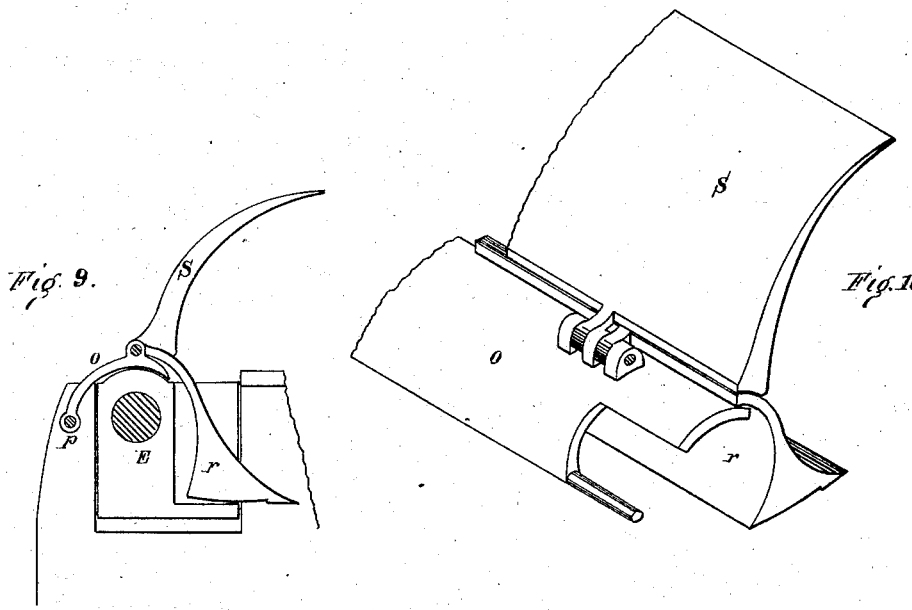

Figure 1 is a top plan of part of my improvement. Fig. 2 shows the end elevation of my riding-frame, hereinafter described. Fig. 3 is a drawing showing the position of the pinion and gears which draw the feed-rolls. Fig. 4 is a top plan, showing the cover and fender, which form another part of my improvement. Fig. 5 is a section of my planer-bed, and shows my chip-breaker, fender, and feed-roll cover in section, and also shows a side elevation of the mechanism which raises and lowers my planer-bed. Fig. 6 is a transverse section of my feed-roll. Fig. 7 is a longitudinal section thereof. Fig. 8 is a side elevation, part in section, of the vertically-adjustable bearings of the feed-rolls. Fig. 9 is an end view of the cover, chip-breaker, and fender; and Fig. 10 is a perspective of those three elements detached from the other parts of the machine.

At A, Fig. 1, are represented the knives of my planer.

$b\ b$ represent the feed-rolls, which rest in boxes in the frame $c$ of the machine. Only one side of the frame is shown in this drawing. The feed-rolls project beyond the frame of my machine, and upon the projecting ends are fixed geared wheels $d\ d$, which, being driven by the pinion $e$, cause the feed-rolls to revolve.

Upon the ends of the feed-rolls, and between the geared wheels $d\ d$ and the frame $c$ of the planer, I place a riding-frame, (shown at $f$, Fig. 2,) which is one part of the subject-matter of my invention. The ends of my riding-frame are provided with boxes, as shown, in which the feed-rolls revolve; and midway between the feed-rolls upon the frame, either above or below, or upon a line which would join the centers of the gears $d\ d$, I fix a stud, $s$, upon which the driving-pinion $e$ revolves. The driving-pinion $e$ is cast upon and forms part of the pulley $h$, driven by the belt $g$.

Part of my improvement consists in fixing the stud $s$, upon which the driving-pinion $e$ and pulley $h$ revolve, upon a riding-frame, $f$, supported on the ends of the feed-rolls, instead of fixing said stud upon the frame of the machine itself, as the practice heretofore has been. I thus avoid the tendency which the driving-pinion had to lift the feed-roll off the stock, and I am furthermore enabled to keep the gears which revolve the feed-rolls and the driving-pinion and pulley in the same position relative to each other, so that the gears will not be disarranged and the teeth will interlock properly at all times. I am also enabled to employ larger gears to drive the feed-rolls, if necessary, because I am not compelled to place my driving-pinion in line with the centers of revolution of the gears upon the feed-rolls, but can place it above or below said gears, so that the gears themselves may be large enough to nearly touch each other—an object that cannot be accomplished when the driving-pinion revolves on a stud fixed to the frame of my machine.

Another part of my improvement consists in the chip-breaker and fender and feed-roll cover shown in Fig. 5.

At $a$, Fig. 5, is represented a section of the knives of my planer.

$o$ represents a cover for my feed-roll, (shown in section pivoted at $p$,) which cover is provided with ears $q$, to which the chip-breaker $r$ and fender S are each attached. The chip-breaker $r$ rests upon the stock, being held down by its own weight and the weight of the fender which rests upon it. The cover $o$ rests upon the box which carries the feed-rolls, which box rises as the stock is introduced. The roller $b$ is secured in the box E, which is free to move up and down in the frame of the machine, as shown, so that a board of irregular thickness, in passing toward the cutter, raises and lowers the roller and maintains a uniform pressure without undue strain on the parts. The roller is held to a bearing by the counter-weight G, which may be adjusted by moving along the lever F; and it will be seen that by the raising of the box the chip-breaker will be drawn back and prevented from coming in contact with the cutters. The point of the chip-breaker moves in a curve very nearly concentric with the circle described by the knives. A top view of my fender and feed-roll cover is shown at Fig. 4.

Another part of my improvement consists in the hoisting apparatus which raises and lowers the bed.

A central column, $t$, is bolted to the under side of my planer-bed, and acts as a guide and holds the bed in position. It is in two sizes, and slides up and down, closely fitting in apertures made to receive it, (shown in the frame at $u\ u$.) At the upper end of this column, and revolving on it, I place a spur and bevel or crown gear, D, cast together. The gear B engages with a pinion, V, which is driven by a hand-crank. The spur-gear D engages with the pinions W W, which are fixed to screws which ply up and down in the frame at $x\ x$. The upper ends of the screws touch the bottom of the planer-bed at $y\ y$ and raise and lower it, the column $t$ merely acting as a guide.

Another part of my improvement consists in placing alternate rings of rubber and metal upon the central shaft of the forward feed-roll.

I groove my feed-roll shaft lengthwise, and the metallic rings $m$, Fig. 6, are provided with a projection, $i$, which rests in the groove and compels them to revolve with the shaft. Upon the sides of my metallic rings I provide small spurs or teeth, which engage with the soft rubber and compel the rubber rings to revolve with the shaft. The metal rings are much thinner than the rubber rings, and are much exaggerated in thickness in the drawings to make the illustration plainer.

Referring to Fig. 7, $j$ is the shaft, and $k$ a collar which screws on each end to confine the metal and rubber rings in place.

$l\ l\ l$ represent rubber rings, and $m\ m\ m$ represent metallic rings, and together they make up my feed-roll.

By the use of the rubber roll I dispense with the use of a roll in the bed of the planer to relieve the friction, and my planer-bed may be smooth. I obtain sufficient friction with my rubber roll so that the stock rests at all times on the planer-bed, leaving no opportunity for vibration. A roll of this description takes better hold on the stock, and pulls harder than the two iron rolls used to do with the stock passing between them. These rings of rubber are very easily renewed when they become worn by unscrewing the collar $k$ and slipping off the old ones and slipping on the new ones.

I claim as my invention and desire to secure by Letters Patent—

1. In a planing-machine, the combination of the supporting-frame C, feed-rolls $b$ and their gear-wheels $d$, and a riding-frame, $f$, suspended from the rolls, between the same, and provided with the stud $s$, on which turns the pinion $e$ and pulley $h$, whereby the several parts will operate as set forth.

2. In a planing-machine, the chip-breaker $r$, hinged to the cover $o$, which is pivoted to the standard at $p$, back of the feed-roll, whereby it is adapted to rise and fall with the roll and to be thrown back from off the same, as described.

3. In a planing-machine, the fender S, hinged to the cover $o$, which is pivoted to the standard at $p$, back of the feed-roll, whereby it is adapted to rise and fall with the roll and to be thrown back from over the same, as described.

4. The combination of the cover $o$, pivoted at $p$, resting upon the feed-roll box, and the chip-breaker $r$, and fender S, attached by means of the ears $q$, arranged and operating substantially as shown.

5. The guided column $t$, provided with gears B and D, and combined with gear V, the parts being relatively arranged, as shown, to raise and lower the table, as set forth.

6. The combination of screws $x$, carrying spurs W, guided column $t$, having gear D, and arranged to rise and fall with the screws, as shown, to operate the bed, as set forth.

7. The combination of guided column $t$, gears B and D on said column, gear V, spurs W, and screws $x\ x$, the parts being relatively arranged, as shown, to operate the bed, as set forth.

EDWARD F. GORDON.

Witnesses:
CHAS. C. LUND,
FRANK A. MERRILL.